(12) United States Patent
Schuetz

(10) Patent No.: US 6,551,053 B1
(45) Date of Patent: Apr. 22, 2003

(54) HYDRO-ELECTRIC GENERATOR

(76) Inventor: C. Ed Schuetz, 6126 Chrismark Ave., San Diego, CA (US) 92120

( * ) Notice: Subject to any disclaimer, the term of this patent is extended or adjusted under 35 U.S.C. 154(b) by 0 days.

(21) Appl. No.: 09/952,860

(22) Filed: Sep. 14, 2001

(51) Int. Cl.$^7$ .................................................. F03B 7/00
(52) U.S. Cl. ........................... 415/3.1; 415/2.1; 415/7; 415/60; 415/123; 416/85; 416/169 R; 416/DIG. 4; 416/DIG. 6; 290/53; 290/54
(58) Field of Search .............................. 415/2.1, 3.1, 7, 415/60, 122.1, 123, 905, 906; 416/84–86, DIG. 4, DIG. 6, 169 R; 60/398; 290/42, 43, 53, 54

(56) References Cited

U.S. PATENT DOCUMENTS

| 1,067,722 A | * | 7/1913 | Fairbanks ........................ 415/7 |
| 1,516,681 A | * | 11/1924 | Palmer ........................ 415/123 |
| 3,644,052 A | | 2/1972 | Lininger |
| 3,687,567 A | | 8/1972 | Lininger |
| 3,746,875 A | | 7/1973 | Donatelli |
| 4,023,041 A | | 5/1977 | Chappell |
| 4,122,676 A | * | 10/1978 | Kikut ........................ 60/398 |
| 4,301,377 A | | 11/1981 | Rydz |
| 6,133,644 A | | 10/2000 | Smith et al. |
| 6,365,984 B1 | * | 4/2002 | Shu ........................ 290/53 |

FOREIGN PATENT DOCUMENTS

| DE | 4325122 A1 | * | 2/1995 | ................ 415/3.1 |
| FR | 717946 A | * | 1/1932 | ................ 416/85 |
| NL | 8500252 A | * | 8/1986 | ................ 290/42 |

* cited by examiner

Primary Examiner—Christopher Verdier

(57) ABSTRACT

A hydro-electric generator for producing electricity in areas of flowing water. The hydro-electric generator includes a flotation device. An electric generator is mounted on the floatation device. A paddle wheel is rotatably mounted to the floatation device. The paddle wheel is mechanically coupled to the electric generator. The floatation device is anchored in an area of flowing water such that a current rotates the paddle wheel and electricity is produced.

2 Claims, 5 Drawing Sheets

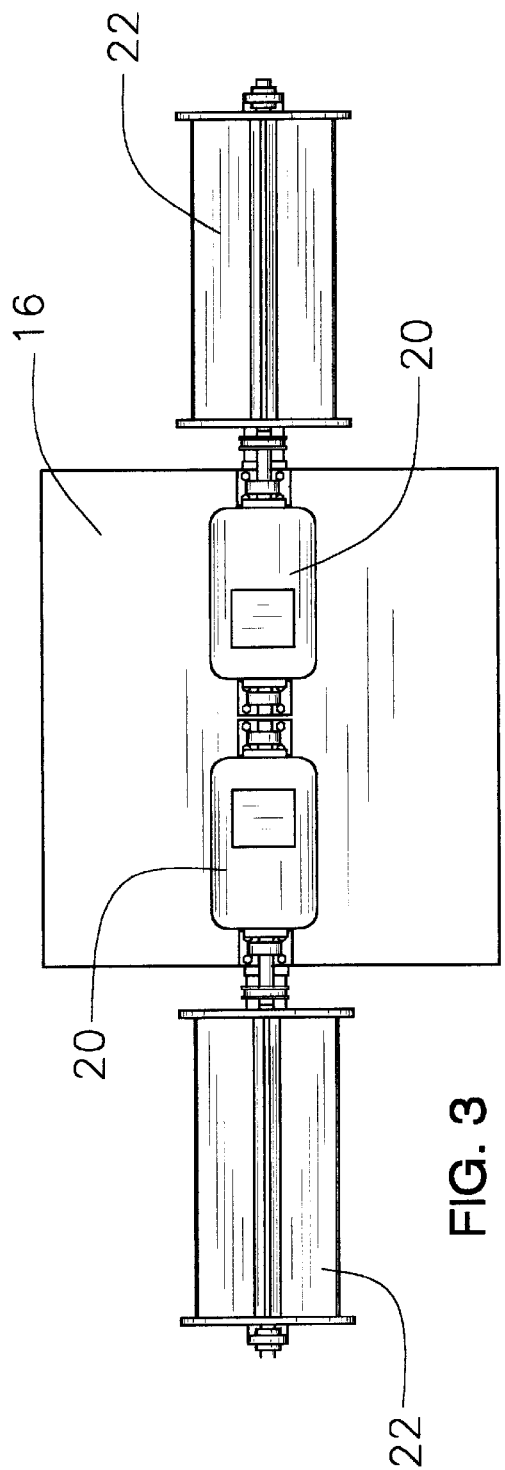
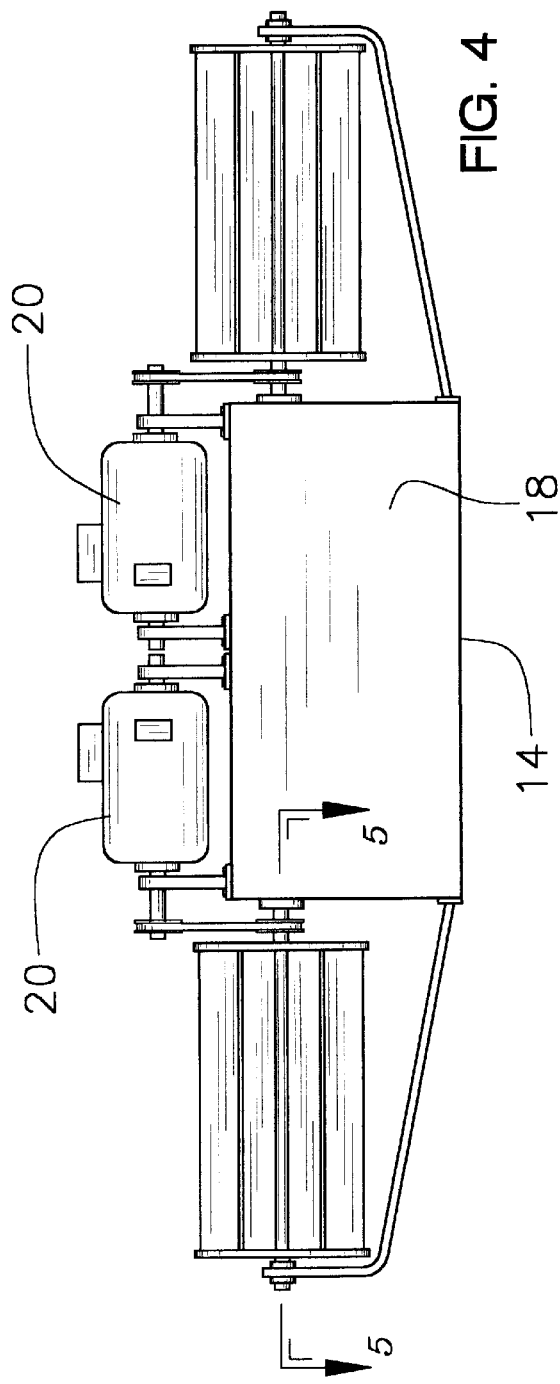

_

HYDRO-ELECTRIC GENERATOR

BACKGROUND OF THE INVENTION

1. Field of the Invention

The present invention relates to electricity generating devices and more particularly pertains to a new hydro-electric generator for producing electricity in areas of flowing water.

2. Description of the Prior Art

The use of electricity generating devices is known in the prior art. U.S. Pat. No. 3,644,052 describes a device for producing electricity from the motion of waves. Another type of electricity generating devices is U.S. Pat. No. 6,133,644 which utilizes the ocean's surf to produce electricity.

While these devices fulfill their respective, particular objectives and requirements, the need remains for a device which is portable and can be positioned in any area where water flow can be used for producing electricity.

SUMMARY OF THE INVENTION

The present invention meets the needs presented above by using a barge type floatation device to mount generators on to produce electricity where needed.

To this, the present invention generally comprises a flotation device. An electric generator is mounted on the floatation device. A paddle wheel is rotatably mounted to the floatation device. The paddle wheel is mechanical coupled to the electric generator. The floatation device is anchored in an area of flowing water such that a current rotates the paddle wheel and electricity is produced.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic top view of the present invention.

FIG. 4 is a schematic side view of the present invention.

DESCRIPTION OF THE PREFERRED EMBODIMENT

Figure 1:
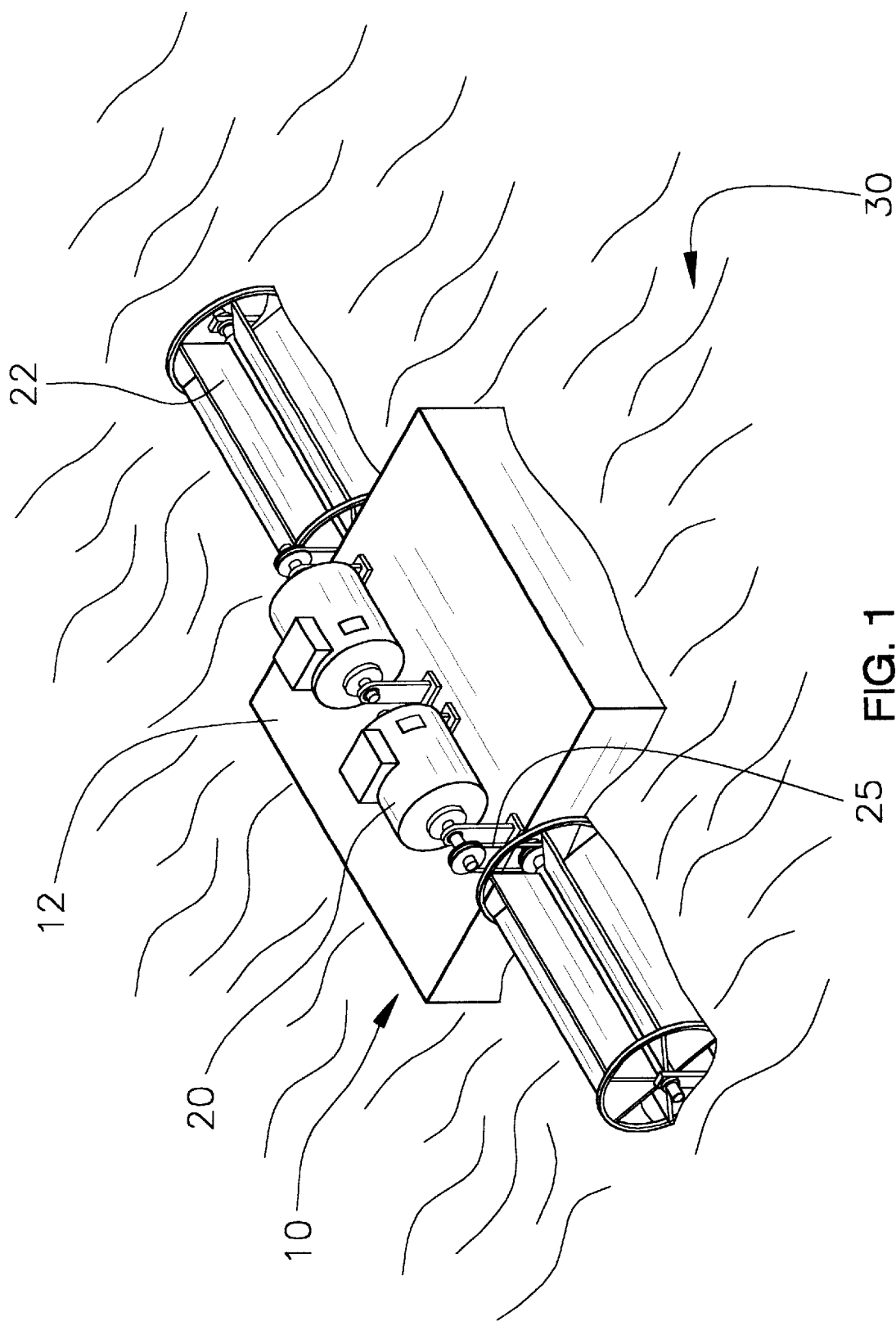
FIG. 1 is a schematic perspective view of a new hydro-electric generator according to the present invention.
Figure 2:
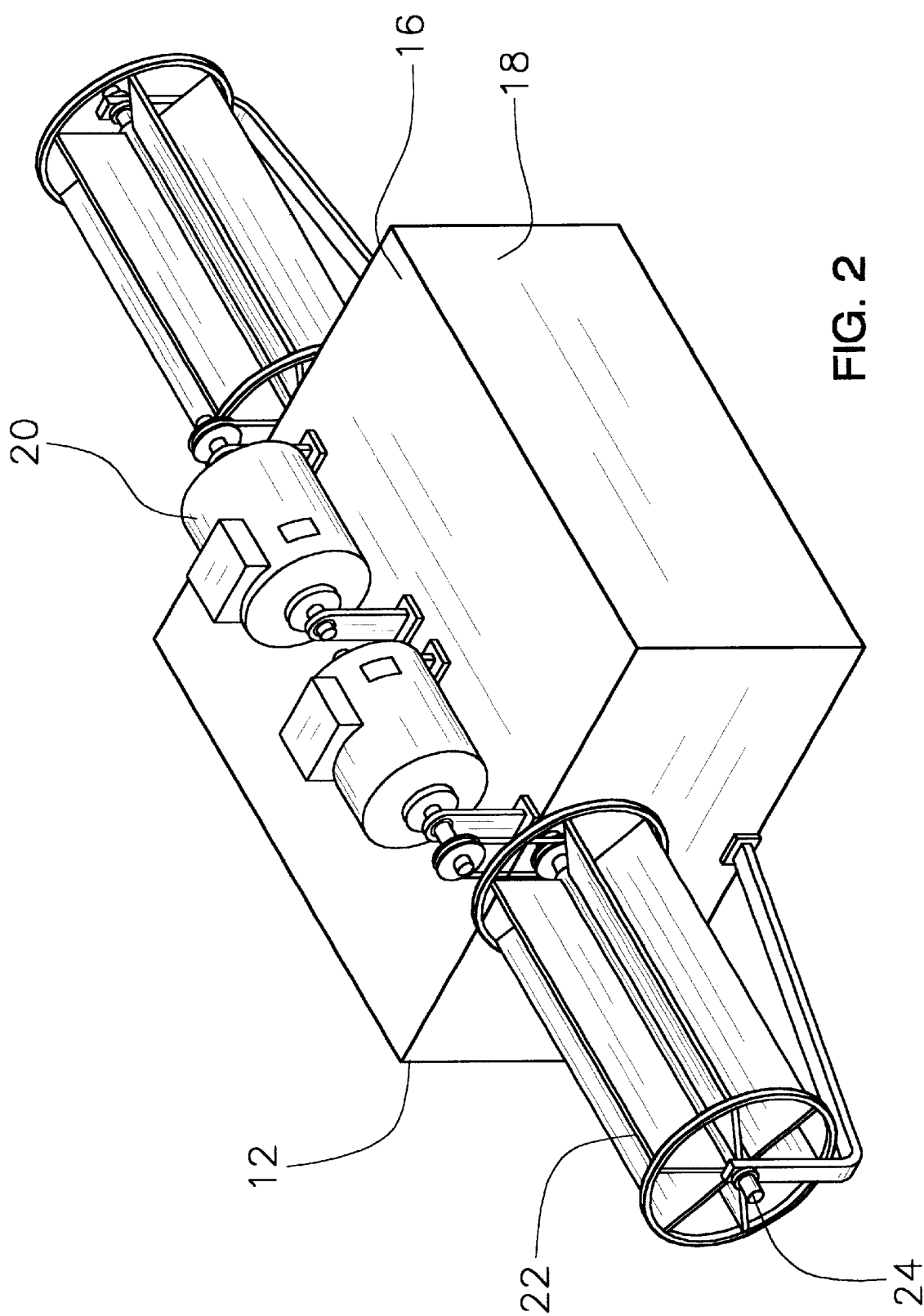
FIG. 2 is a schematic perspective view of the present invention.
Figure 5:
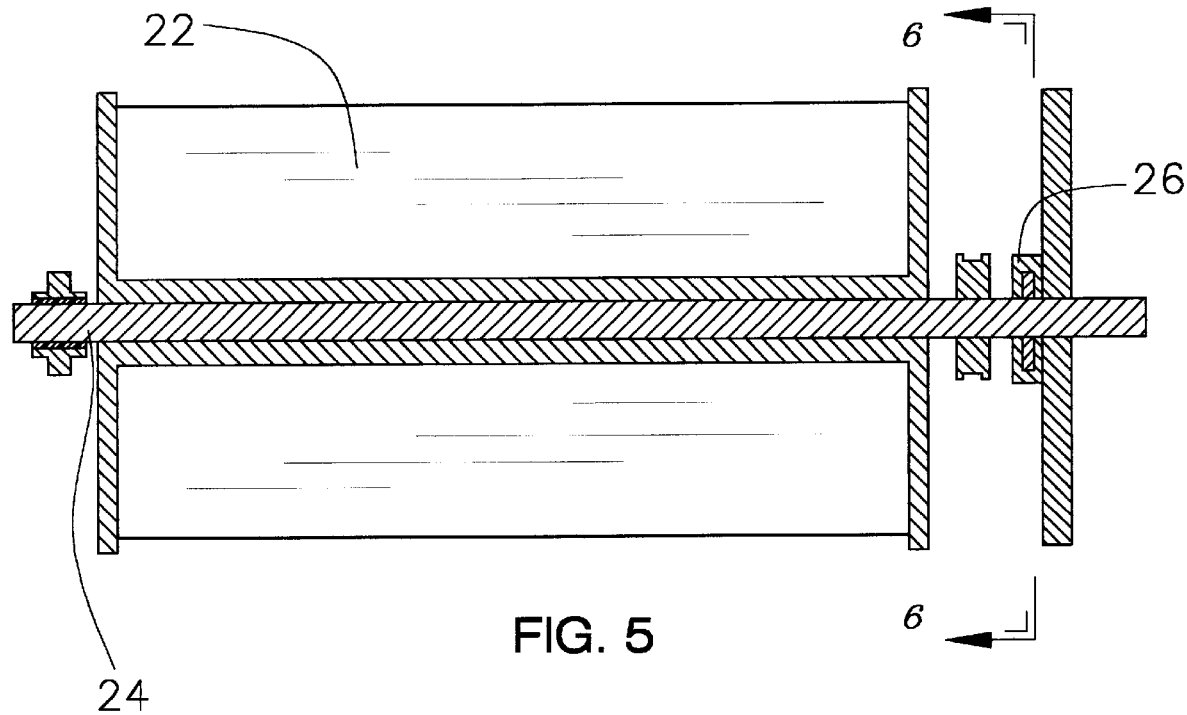
FIG. 5 is a schematic cross-sectional view taken along line 5—5 of the present invention.
Figure 6:
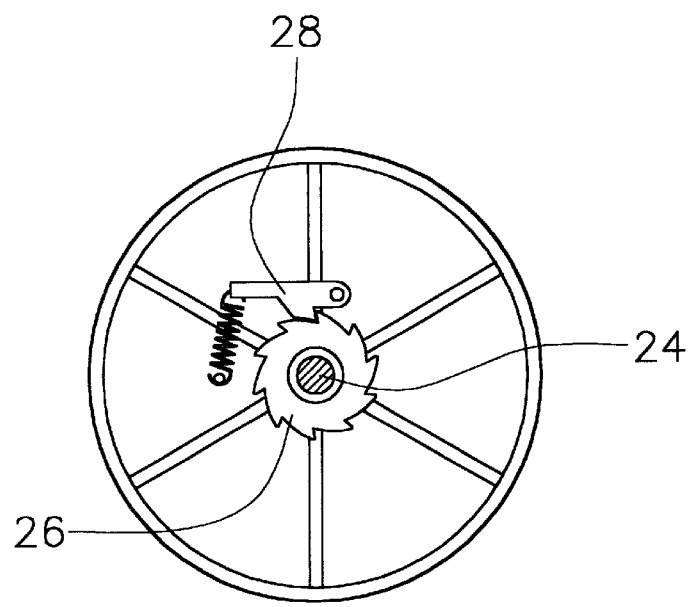
FIG. 6 is a schematic cross-sectional view taken along line 6—6 of the present invention.
Figure 7:
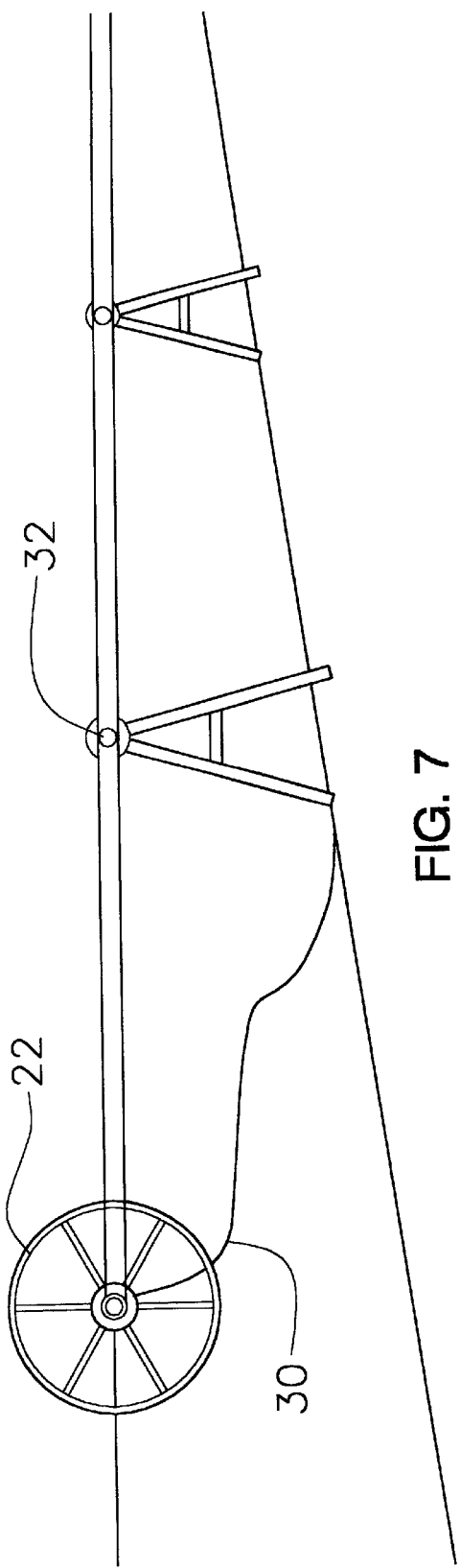
FIG. 7 is a schematic view of the present invention.
Figure 8:
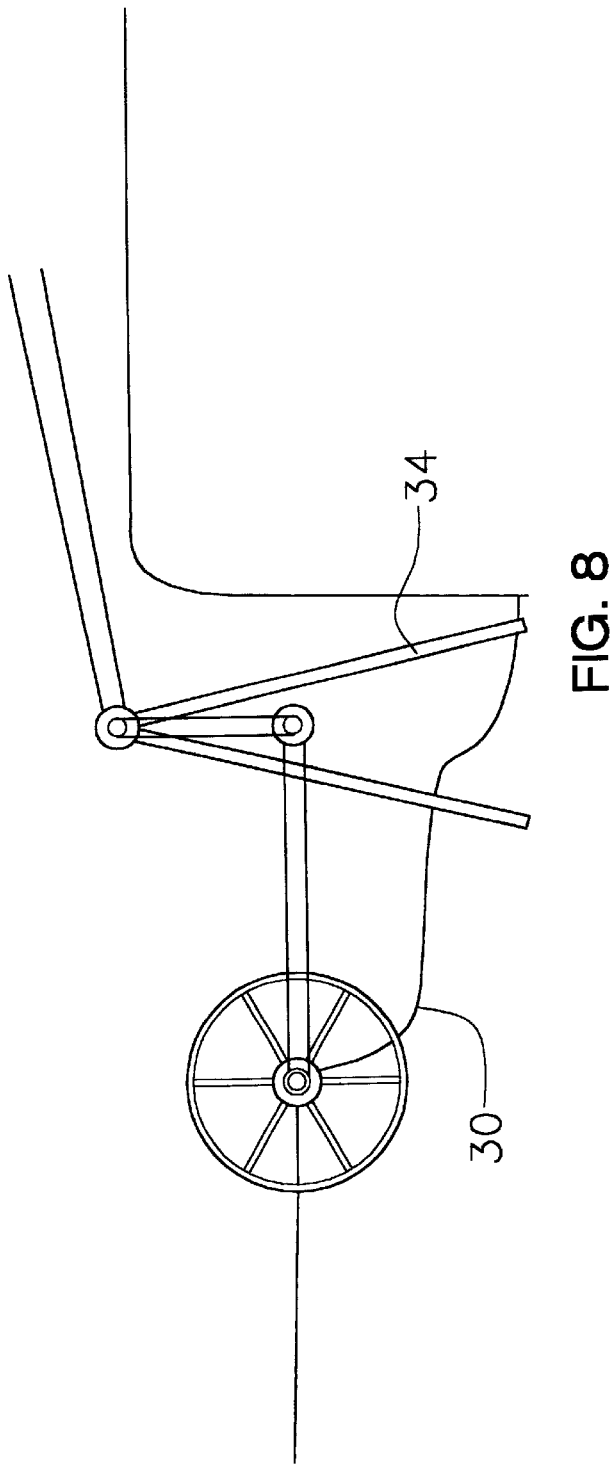
FIG. 8 is a schematic view of the present invention.

With reference now to the drawings, and in particular to FIGS. 1 through 8 thereof, a new hydro-electric generator embodying the principles and concepts of the present invention and generally designated by the reference numeral 10 will be described.

As best illustrated in FIGS. 1 through 8, the hydro-electric generator 10 generally comprises providing a flotation device 12 having a bottom wall 14, a top wall 16 and a peripheral wall 18 extending between the top 16 and bottom 14 walls.

Each of a pair of electric generators 20 for producing electricity is mounted on the top wall 16 of the floatation device 12. The generators 20 are conventional generators.

Each of a pair of paddle wheels 22 is rotatably mounted to the peripheral wall 18 of the floatation device 12. The paddle wheels 22 are positioned on opposite sides of the floatation device 12. Each of the paddle wheels 22 is mounted on lone of a pair of axles 24. Each of a pair of belts 25 is positioned on and extends between one of the axles 24 and one of the generators 20. The generators 20 produce electricity when the paddle wheels 22 turn the axles.

Each of a pair of gears 26 is positioned on one of the axles 24. Each of a pair of detents 28 is mechanically coupled to one of the gears 26 such that the axles 24 are rotational in only one direction.

The floatation device 12 is positioned in water 30 in an area needing electricity. The water 30 needs to be moving water such that a current is produced. The floatation device 12 is anchored in the water 30. The current causes the paddle wheels to rotate. When the paddle wheels 22 rotate, the generators 20 create electricity. Relays 32 are set up for transferring the electricity produced over distances. Towers 34 may be built to accommodate for cliffs or other changes in elevations.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable hydro-electric generator device comprising:
    a flotation device having a bottom wall, a top wall and a peripheral wall extending between said top and bottom walls;
    a pair of electric generators for producing electricity, each of said electric generators being mounted on said top wall of said floatation device;
    a pair of paddle wheels, each of said paddle wheels being rotatably mounted to said peripheral wall of said floatation device, said paddle wheels being positioned on opposite sides of said floatation device, each of said paddle wheels being mounted on an axle, each of a pair of belts being positioned on and extending between one of said axles and one of said generators, wherein said generators produce electricity when said paddle wheels turn said axles;
    a pair of gears, each of said gears being positioned on one of said axles, each of a pair of detents being mechanically coupled to one of said gears such that said axles are rotational in only one direction; and wherein said floatation device is anchored in an area of flowing water such that a current rotates said paddle wheels and electricity is produced.

2. A method of producing electricity comprising the steps of:

providing a flotation device having a bottom wall, a top wall and a peripheral wall extending between said top and bottom walls;

providing a pair of electric generators for producing electricity, each of said electric generators being mounted on said top wall of said floatation device;

providing a pair of paddle wheels, each of said paddle wheels being rotatably mounted to said peripheral wall of said floatation device, said paddle wheels being positioned on opposite sides of said floatation device, each of said paddle wheels being mounted on an axle, each of a pair of belts being positioned on and extending between one of said axles and one of said generators, wherein said generators produce electricity when said paddle wheels turn said axles;

providing a pair of gears, each of said gears being positioned on one of said axles, each of a pair of detents being mechanically coupled to one of said gears such that said axles are rotational in only one direction; and positioning said floatation device in an area of water;

anchoring said floatation device; and rotating said paddle wheels with a current of water such that a current rotates said paddle wheels and electricity is produced.

* * * * *